United States Patent [19]
Kriz et al.

[11] Patent Number: 4,679,915
[45] Date of Patent: Jul. 14, 1987

[54] DEFORMABLE MIRROR

[75] Inventors: Helmut Kriz; Hansjorg Stadler, both of Rückersdorf, Fed. Rep. of Germany

[73] Assignee: Diehl GmbH & Co., Nuremberg, Fed. Rep. of Germany

[21] Appl. No.: 821,064

[22] Filed: Jan. 21, 1986

[30] Foreign Application Priority Data

Jan. 23, 1985 [DE] Fed. Rep. of Germany ....... 3502025

[51] Int. Cl.$^4$ ........................... G02B 5/08; G02B 7/18
[52] U.S. Cl. .................................... 350/611; 350/610; 350/609
[58] Field of Search ............... 350/611, 610, 609, 607, 350/360

[56] References Cited

U.S. PATENT DOCUMENTS

| | | | |
|---|---|---|---|
| 3,620,606 | 11/1971 | Tschunko | 350/611 |
| 4,295,710 | 10/1981 | Heinz | 350/611 |
| 4,500,170 | 2/1985 | Montesanto | 350/611 |

OTHER PUBLICATIONS

N. P. Albertinetti et al, "Discrete Actuator ...", *SPIE*, vol. 179, Adaptive Optical Components 11 (1979), pp. 11-16.

*Primary Examiner*—Jon W. Henry
*Attorney, Agent, or Firm*—Scully, Scott, Murphy & Presser

[57] ABSTRACT

A deformable mirror, especially for the compensation of the influences of atmospheric interferences on the propagation or spreading of high energy laser beams, which incorporates a plurality of electrically actuatable actuators or adjusting elements engaging behind the mirror surface of the mirror. The actuators or adjusting elements is pressed against the rear side of a mirror plate, and is connected therewith along jacket or sheathing surfaces. Thereby, it is possible to achieve an almost point-like introduction of force for the regional deformation of the mirror; inasmuch as the pressure forces can act with a practically randomly small cross-section directly against the rear side of the mirror, while the tensile forces are taken up by the jacket or sheathing surfaces.

14 Claims, 5 Drawing Figures

DEFORMABLE MIRROR

BACKGROUND OF THE INVENTION

1. Field of the Invention

The present invention relates to a deformable mirror, especially for the compensation of the influences of atmospheric interferences on the propagation or spreading of high energy laser beams, which incorporates a plurality of electrically actuatable actuators or adjusting elements engaging behind the mirror surface of the mirror.

2. Discussion of the Prior Art

A deformable mirror of the type referred to hereinabove has become known with respect to its typical constructional and utilization capabilities from the disclosure of FIG. 1 and FIG. 2 of the article by James E. Harvey and Gary M. Callahan "Wavefront Error Compensation Capabilities of Multiactuator Deformable Mirrors" (SPIE Vol. 141, Adaptive Optical Components, 1978, pages 50 through 57).

In order to avoid complicated actions of the control system, required from such a compensating mirror is a most linearly possible relationship between an actuation of an actuator or adjusting element and the therewith associated localized deformation of the mirror surface. Consequently, an effort is made to provide for the most rigid possible mechanical and most pointedly possible coupling or connection of each adjusting element to the rear side of the mirror plate, whose front side serves as a compensation mirror surface which is located in the path of the beam. However, the mechanical coupling between an actuator or adjusting element and the rear side of the mirror plate, which is constructed as an adhesive connection, necessitates an extremely large contact surface in order to be able to also take up comparatively large tensile forces through the adhesive connection. Hereby, such forces are encountered when at least one adjusting element is deflected within a certain area, the mirror surface will then bulge; however, nearby located adjusting elements because of their actuation will be less or not at all deflected and thereby subjected to tension. Such a large-surfaced contact between of the adjusting element and the rear side of the mirror plate, in the interest of providing an adequate adhesive bond, stands opposite the requirement for localized defined deflecting capabilities in the finest possible distribution or arrangement across the mirror surface, in the interest of obtaining optimum correlation capabilities for compensating distortions in the cross-section of the path of the beam. With respect to the dimensioning of the control circuit for the electrical actuation of the actuators or adjusting elements, it is, moreover, undesirable in that such adhesive bonds or connections possess a certain elasticity in the direction of pressure transmission and, as a result, must be taken into consideration during the design of the control circuit must be considered as disturbing damping and even propagation time influences.

SUMMARY OF THE INVENTION

In recognition of these conditions, it is an object of the present invention to so design a compensating mirror of that type of construction, which at the lowest possible actuating demands on control technology, facilitates a finely arranged, defined compensation of the atmospheric propagation interferences across the cross-section of the path of the beam, and is thereby simply produceable and adjustable, as well as being dependably employable.

The foregoing object is inventively achieved in that the compensating mirror of the type described herein has the actuators or adjusting elements pressed against the rear side of a mirror plate, and is connected therewith along jacket or sheathing surfaces.

In accordance with this solution, it is possible to achieve an almost point-like introduction of force for the regional deformation of the mirror; inasmuch as the pressure forces can act with a practically randomly small cross-section directly against the rear side of the mirror, while the tensile forces are taken up by the jacket or sheathing surfaces; thus, for example, for adhesive connections over large-surfaced adhesive zones which are subjected to shear loads. Provided for this attachment are pivots or trunnions, which are preferably integrally formed on the rear side of the mirror plate (for instance, machined or without machining formed thereon), the mirror plate itself can be constructed as thin as possible; in essence, without the need for moving a large mass, to be deformed easily and in a locally defined manner. Herein, namely, the geometry of the introduction of the force from the actuators or adjusting elements to the mirror plate can be influenced by the cross-section of the connecting pivots or trunnions, which facilitate a mechanically stable and rigid attachment, in effect, for an adjusting element engagement without any interposes adhesive connection in the direction of pressure. As a result, there are also opened rotational possibilities for a precision adjustment with respect to the prestressing of the adjusting elements which are supported against the mirror plate; inasmuch as there will no longer occur any losses in sensitivity (with respect to the attachment of an adjusting element to the associated rearwardly facing region of the deformable mirror surface) caused by the elasticity and as a result of hysteresis influences of interposed adhesive layers.

BRIEF DESCRIPTION OF THE DRAWINGS

Reference may now be had to the following detailed description of additional alternatives and modifications as well as further features and advantages of the invention, taken in connection with the accompanying drawing which are schematically illustrated and restricted to the essential inventive characteristics, and which are not necessarily drawn to scale; in which.

DETAILED DESCRIPTION

Figure 1:
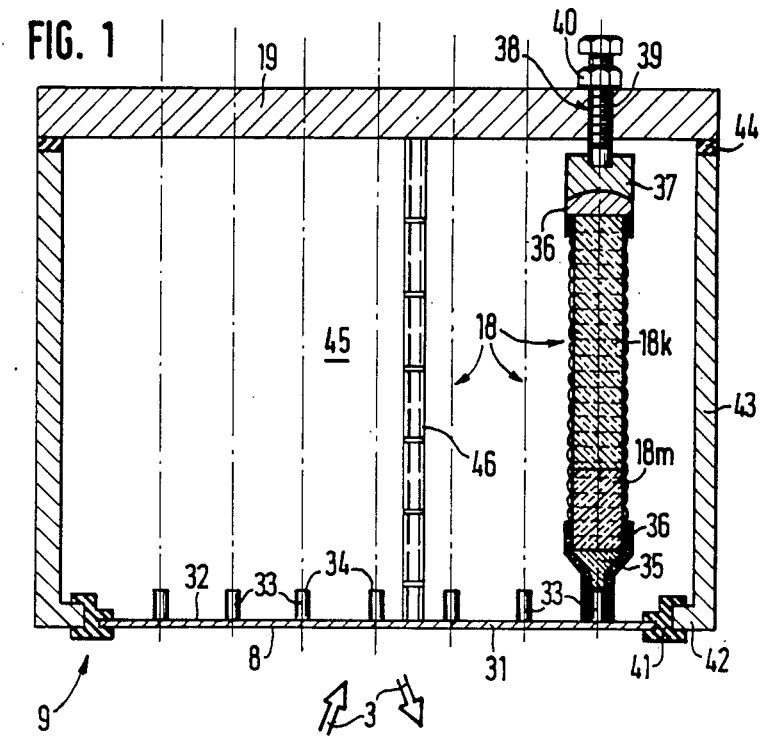
FIG. 1 illustrates a cross-sectional view through a deformable compensating mirror, with socket connections between the rearwardly formed trunnions and adjusting elements which are supported thereon.

As is shown in detail, located in the path 3 of a beam is the mirror surface 8 of an MDA compensating mirror 9. This mirror, through exerting an optical influence over the optical conditions in the applicable cross-sectional regions of the path 3 of the beam, serves to provide a compensation of distortions to which the beam geometry is subjected during passage through the atmosphere, in order to be able to concentrate the beam energy in the most narrowly restricted focal point on a target.

Provided for the deformation of the mirror surface 8 (through displacement of individual of its regions with respect to each other in the direction of the normal towards the mirror surface 8) are rearward linear adjusting elements 18, which are clamped between the mirror surface 8 and an abutment 19. These actuator elements 18, in accordance with their electrical actuation, are subjected to a change in length for the respective bulging or curving of the region of the mirror surface 8 located in front thereof. Preferably, the actuators or adjusting elements 18 relate to piezo-columns, inasmuch as these possess good linear response characteristics at a high response limiting frequency, and allow for the introduction of high as well as reproducible pressure forces behind the mirror surface 8.

Figure 2:
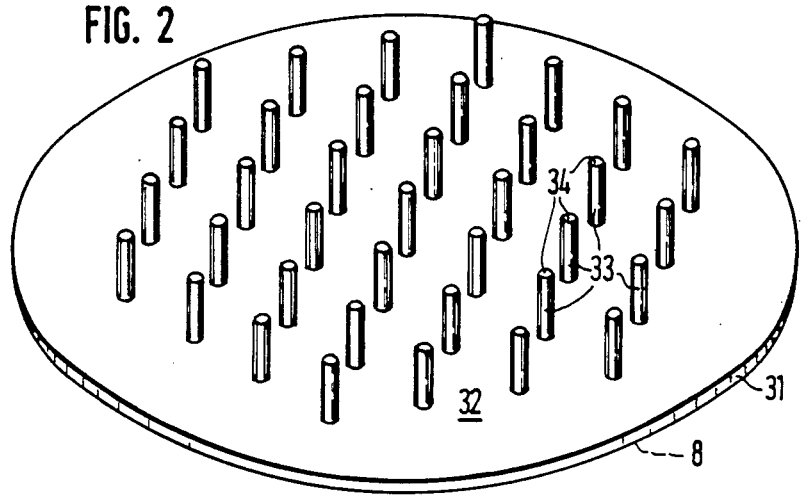
FIG. 2 illustrates a perspective rear view of the arrangement of the trunnions or pivots on the rear side of a mirror plate pursuant to FIG. 1.

For such a defined deformation of the mirror surface 8, an effort is made to obtain the possibly most point-like contact of the actuators or adjusting elements 18 behind the surface. For this purpose, the mirror surface 8 is formed on the front side of a thin mirror plate 31, on the rear side of which 32 there are also provided comparatively thin pivots or sleeve-shaped trunnions 33, in essence (further details thereof being set forth hereinbelow), are formed integrally therewith. The diameter of the trunnions 33, in the example of FIGS. 1 and 2, is somewhat greater than the thickness of the mirror plate 31; however, it is of the same magnitude (of a few millimeters in the instance of a diameter of a mirror plate being of the magnitude, for example, of about 150 mm to 250 mm). The points of pressure introduction by the adjusting elements 18 into the mirror plate 31 are also constructively given through relatively thin trunnions 33 with their end surface 34 freely rearwardly projecting.

Actuator elements 18 possessing a small diameter can be set directly abutingly on the trunnion end surface 34. For actuator or adjusting elements 18 possessing a larger diameter it is expedient, as is considered in FIG. 1, to interpose conical coupling members 35 behind the mirror surface 8 for geometric correlation and thereby an optimum introduction of force. An effort is to be made that the cross-section of the introduction of force which is effective with respect to the mirror surface 8, due to the small diameter of the trunnions 33 in comparison with the diameter of the mirror plate 31, and in comparison with the mutual spacing of the trunnions 33, is as point-like as possible.

In the direction of pressure transmission, between the adjusting elements 18 and the rear side 32 of the mirror in effect, the associated trunnions 33, there is no need to provide any nonrigid mechanical coupling means, and especially no adhesive medium, inasmuch as the mechanical connection along the generated contact surfaces between the adjusting element 18 and the trunnion 33 which is subjected to tension, can in this instance be formed along the inner generated surface of a sleeve 36. This sleeve 36, as illustrated in the drawing, can be shaped funicular in its axial longitudinal section, when a conical coupling member 35 is arranged between a trunnion 33 and the actual adjusting element 18 so as to provide for the correlation in the cross-section. The sleeve or bushing 36 can be shrink-fitted thereon; however, in the simplest case it is glued along the adjoining generated casing surface together with the adjusting element 18 and the trunnion 33; wherein the connecting sleeve 36 (and the length of the trunnion 33) is designed to be so lengthy that there is afforded the necessary adhesive surface in the parallel shear direction for assuming the tensile force and transfer along the inner wall of the sleeve 36. The coupling of the actuator or adjusting element 18 to the trunnion 33 which is oriented in the direction of the pressure, and thereby towards the associated region of the mirror plate 31 or the mirror plate 8, thus remains free of any adhesive material due to the directly abuting contacting push; and consequently free of masses which would dampen the introduction of forces into the plate 31, which otherwise due to the requirements, must consider damping phenomena, and possibly also propagation time phenomena which would lead to a complicated structure of the control circuit for the compensating actuation of the mirror surface 8.

The fact that the annularly-shaped adhesive surface, which is subjected to shear during the introduction of tensile forces, possesses a certain degree of elasticity, is not disturbing, inasmuch as this is extremely low because of the thin adhesive gap; and moreover, may even provide a desirable mechanical uncoupling between an extensively actuated actuator or adjusting element 18 and a neighboring less intensely (and thereby subjected to tension) adjusting element 18, with a correspondingly constantly compensated or balanced extent of bulging of the mirror surface 8 between the neighboring rearward engaging points of the adjusting elements 18.

As is illustrated in FIG. 1, for introducing the pressure force of an actuator or adjusting element 18 into the mirror plate 31, there is suitably provided in series with a short modulation actuator element 18$m$ a separate multiple lengthier correcting actuator element 18$k$, as well as a rear support 37. Located behind the latter is an adjusting component 38, preferably in the shape of a threaded bolt 39 with a lock nut 40, and which is guided in the mirror abutment 19, in order to be able to individually adjust the mechanical prestressing of the individual actuators or adjusting elements 18 and to thereby, for example, impart to the mirror surface 8 a stationary initial deformation in correlation with other optics influencing parameters located in the path 3 of the beam path.

The mirror plate 31 is retained through the intermediary of an encompassing rubber seal 41 against an end flange 42 of a hollow cylinder 43 which, at its rear end supports the abutment 19 for adjusting elements 18 through the interposition of an elastic seal 44. The space within the hollow cylinder 43, in essence, about the adjusting elements 18 between the abutment 19 and the mirror plate 31, is preferably filled with electrically-insulating and relatively high-viscous, as well as good as possible heat-conductive liquid 45, for instance, such as oil. On the one hand, this serves to provide for a mechanical damping of the mechanical movements in the mirror plate 31 which occur under the influence of the actuation of the adjusting elements 18, and on the other hand, for dissipation the heat produced thereby and through the incidence of the beams into the mirror surface 8; and moreover, for the electrical insulation between the piezo-adjusting elements 18 which are operated with relatively high voltages.

For effecting an uncoupling between the actuators or adjusting elements 18 and for the absorption of the pressure fluctuations in the relatively incompressible liquid 45, there can serve gas cushions 46 which, for example, are arranged in the form of grids constituted of closed-porous plastic material between the adjusting elements 18.

Figure 3:
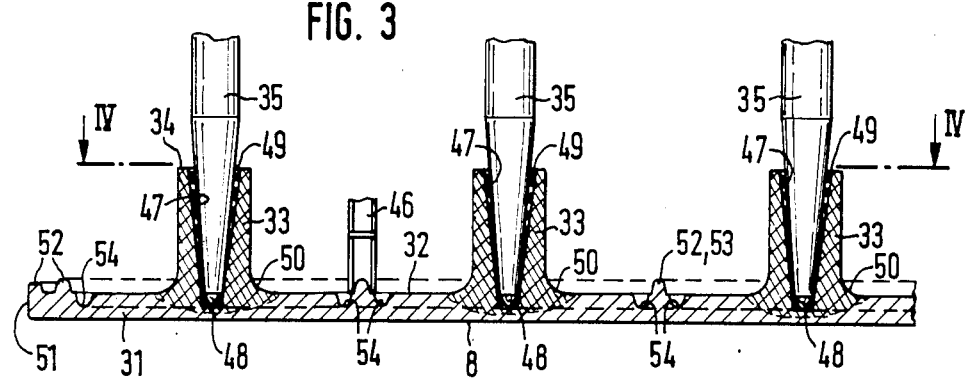
FIG. 3 illustrates a fragmentary sectional view of a modified embodiment of a mirror plate relative to FIGS. 1 or 2, in this instance with hollow trunnions encompassed by uncoupling compounds.

In the actual constructional embodiment pursuant to FIG. 3, the trunnions 33 which are formed on the rear of on the mirror surface 31, each possess a coaxial hollow space 47 in their end surface 34, which preferably even extends into the plate 31 and thereby extends from rearwardly close to the mirror surface. Engaging into this hollow space 47 is a correspondingly geometrically conformed coupling member 35, such that its pressure transmitting tip 48 leads to a point-like introduction of force closely behind the mirror surface 8.

The function of the sleeve 36 (pursuant to FIG. 1) is herein also taken over in the region of the trunnions 33 by the wall of its hollow space 47. Preferably, the hollow space 47 or the therein engaging region of the coupling member 35 is so configured in a longitudinal section, that there is obtained an adhesive gap 49, which conically widens towards the end surface 34, intermediate the hollow space 47 and the therein engaging coupling member 35. This provides the advantage that by means of a thin adhesive layer, as shown in cross section in gap 49, in the region of the rear side 32 of the plate, there can be attained a rigid connection of the coupling member 35, while opposite thereto in the direction towards the trunnion end surface 34 there is obtained an increasingly elastic connection; whereby there is reduced any tight mechanical coupling to a neighboring trunnion 33 through frictional forces along the outer wall of a trunnion 33 and a plate rear side 32. Herein, an effort is made to obtain a circularly-symmetrical formation of the bulging of the mirror surface 8 about the point 48 of force introduction, with a deflection or bulge amplitude which attenuates in cross-section pursuant to a gaussic distribution curve; however, which in actual practice is disrupted through the force introducing conditions from the neighboring trunnions 33.

The mirror plate 31 together with the trunnions 33 which are formed on the rear thereof, and its mirror surface 8 can be produced either through machining (for example, milled from a solid) or without machining (for example, from a casting); preferably it is constituted of copper, inasmuch as this possesses favorable reflective properties with regard to infrared radiation and with good temperature dissipating properties. Extraordinarily good reflective properties are evidenced by a metallic mirror plate 31 in which no grain boundaries are present; for instance, which is propagated as a monocrystal, and which in the most expedient instance does not even require polishing of its mirror surface 8. In this instance it is particularly expedient to allow for the concurrent growth of the trunnions 33 on the rear surface of the plate 31; in order to also avoid any grain boundaries to be formed in the trunnions 33; inasmuch as in this manner are there avoided any lattice distortions which, conceivably, could lead on the mirror surface 8 to an adverse influence over the reflective effects; and such a monocrystalline structure of the plate 31 with the trunnions 33 on the rear thereof also evidences particularly satisfactory properties with respect to the regional deformation pursuant to the extent of localized rearward introductions of force. At a monocrystalline growth of the trunnion 33 on the rear side 32 of the plate, suitably, through applicable nuclei orientation deflective measures, there are formed curvilinear root areas 50 at the transitions from the rear side 32 of the plate to the cylindrical outer wall of the trunnions 33, in order to all possibly avoid herein any sharp kink locations and thereby any material fatigue phenomena caused by the alternating introductions of force from the actuators or adjusting elements 18. Preferably, such a curvilinear root area 50 does not extend circularly symmetrical about the axis of a trunnion 33, but is overally distorted in different directions and thereby applied adhesive sheet like on the rear side 32 of the plate, as is illustrated by the overall representation of FIG. 4. As a consequence, the introduction of the (tensile) force from one coupling element 35 through the surrounding hollow trunnion 33 into the rear side 32 of the mirror plate 31 is not circularly symmetrical; in view of which the anisotropy of the mechanical properties (especially the modulus of elasticity) of the monocrystalline metal plate 31 allows itself to be extensively compensated, which notwithstanding the point-like introduction of force can lead to a non-pointlike symmetrical deformation, and as a result not to the desired bulging or deflecting geometry of the mirror surface 8. The formation and orientation of such non-circular root areas 50 are to be so designed as to be oriented relative to the crystal matrix-elementary cubics in the concrete instance of the monocrystalline-propagated plate 31 (which can be determined through the intermediary of crystallography and material information).

As is illustrated in FIG. 3 through the cross-hatching, for a further increase in the mechanical strength of the trunnions 33, notwithstanding the most possibly soft, and easily deformable material for the plate 31, and especially to avoid brittle failure phenomena in the root area 50, provision can be made that after the monocrystalline growth of the plate 31 with the still pure edge region of the mirror surface 8, to add to the smelt an alloy material such as, for example, especially beryllium (in the magnitude of between 1% and 2%) whereby, about the engaging point of the tip 48 of the coupling element, and thereby in the trunnion root area 50 as well as for the trunnions 33 themselves, to obtain an alloy and thereby a mechanically higher stressable material on the matrix structure of the material of the mirror surface 8.

Figure 4:
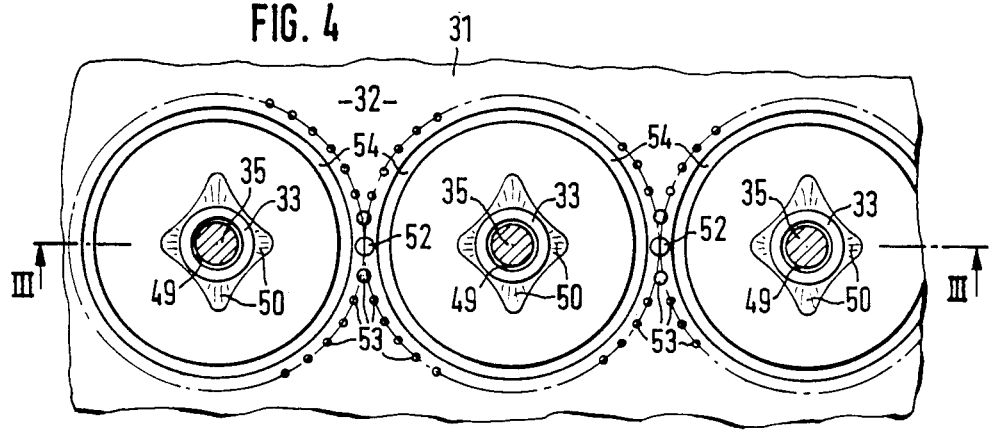
FIG. 4 illustrates a rear plan view of a segment of a mirror plate pursuant to FIG. 3.

This also enhances the compensating effect of a structured root area 50 which deviates in plan view from the circular shape (FIG. 4).

As is considered in FIG. 3, it can be expedient to regionally vary the cross-sectional geometry and thereby the mass of the mirror plate 31, in order to thereby achieve a deattenuation coupling for the mechanical vibrations which spread out from the individual trunnions 33 to the neighboring trunnions 33; for instance, which are reflected at the plate rim 51. Such uncoupling masses consist especially of beadings or reinforcements 52 which extend across the rear side 32 of the plate along the rim 51 and about the trunnions 33. Hereby, these uncoupling beadings 52, as is also illustrated in FIG. 4 need not be constructed in a continuous manner; it is sufficient to provide the formation in the shape of a series of individual humps or protuberances 53. As is also ascertainable from FIG. 4, it is expedient that in the connecting line between mutually neighboring trunnions 33, there be formed more extensive uncoupling measures in the form, for example, of higher or wider humps or protuberances 53 than in regions in which the nearest neighboring trunnions 33 are more remote from each other. A precise mechanical correlation can be simply effected through regional mass or weight reductions; for example, by the working down of predetermined protuberances 53. In comparison with the simplified representation in FIG. 4, the arrangement of the uncoupling reinforcements 52 need not extend circularly concentrically about the applicable trunnions 33; in conformance with the geometry of distribution of the trunnions 33 on the rear side 32 of the plate it can be even more expedient to form a polygonal array, and as a result a honey combed structure from the entirety of the uncoupling reinforcements 52 on the rear side 32 of the plate.

As is illustrated in FIG. 3, at least a few of such beadings or reinforcements 52 or protuberances 53 are expediently so designed and utilized as to contain the grid structures for the gas cushions 46, for the mechanical uncoupling of the actuators or adjusting elements 18 through the damping liquid 45.

Instead of the additional damping masses in the form of the individual humps or protuberances 53 or the encompassing beadings 52 on the rear side 32 of the plate, or in addition to these measures, for the mechanical uncoupling of the introductions of force taking place at the neighboring trunnions 33, there can be also provided weakenings in the material of the plate 31 such as, for example, grooves 54 extending in the rear side 32 of the plate. Also these, in contrast with the simplified representation in FIG. 4, can possess a honey combed pattern in accordance with the extent of the geometric distribution of the trunnions 33.

Figure 5:
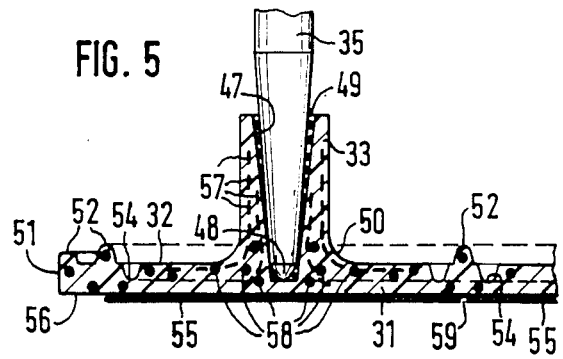
FIG. 5 illustrates a cross-sectional representation of a connecting mirror plate pursuant to FIG. 3.

In the interest of a mechanically, and essentially also with respect to the localized alternating loads, most possibly stable mirror plate 31, at possibly lowest masses which are to be moved by the adjusting elements 18, pursuant to the representation of FIG. 5, there can also be provided a composite or sandwich-structured mirror plate 31. In this plate, a foil 55 constituted of metal which serves as the mirror surface 8, preferably again constructed of copper, can be rigidly fastened on the front surface 56 of a support plate 31 having pivots or trunnions 33 formed on the rear side thereof.

The foregoing is produced from fiber-reinforced structural material, in which the more advantageous heat dissipating properties are provided from reinforcing materials of metal fibers or carbon fibers rather than glass fibers. Through the conical orientation 57 and the annular orientations 58 of the fibers, especially in the root area 50 of the transition from the trunnion 33 to the plate 31, there can be influenced the geometric characteristics of the introduction of forces, and thereby the deformation of the mirror surface 8 pursuant to the measure of the granular or matrix orientation of the foil 55, and thereby concurrently realized a predeterminate uncoupling of the influencing magnitudes which originate from the neighboring trunnion 33.

For the remainder, there can also be provided for this uncoupling a structure on the rear side 32 of the plate pursuant to FIG. 3; in essence with beadings 52 and grooves 54 constituting mass barriers between neighboring trunnions 33 and towards the rim 51.

A still more extensive uncoupling can be occasioned when the mirror surface 8 consists of facetted adjoiningly positioned foils 55, which are each associated with a trunnion 33. The thin slits between the individual foils 55, in effect, the applicable facet boundary 59, does somewhat disrupt the normal dispersion of the attenuation of a point-like bulging in the center in front of a trunnion 33; however, on the other side it acts especially as a barrier against deforming influences caused by a neighboring trunnion 33.

Inasmuch as this position of the facet boundaries 59 relative to the arrangement of the trunnions is fixedly predetermined, then for the remainder the amplitude disruptions can be extensively compensated for through applicable orientations 57, 58 of the extent of the reinforcing fibers within the structural material of the mirror plate 51.

What is claimed is:

1. A deformable mirror, particularly designed to compensate for the influences of atmospheric interference on the propagation or spread of high-energy laser beams, comprising a mirror body having a front thin mirror plate with a mirror surface on the front of the mirror plate and a rear surface on the rear of the mirror plate, and rear surface having a plurality of trunnions formed thereon for coaxial connection to a plurality of electrically-actuatable adjusting elements engageable with said trunnions and pressed against said trunnions and the rear surface of the mirror plate, and further wherein a sleeve connects each said trunnion with an associated electrically-actuable adjusting element which is supported thereagainst and is encompassed by the sleeve.

2. A mirror as claimed in claim 1, wherein each adjusting element is coupled to each trunnion by a geometrically correlated coupling element which is clamped intermediate each said adjusting element and trunnion.

3. A mirror as claimed in claim 1, wherein each adjusting element is coupled to each trunnion by a coupling element coaxially engaged in a hollow space formed in each trunnion, and each coupling element has a pressure transmitting tip supported in the hollow space in the trunnion behind the mirror surface.

4. A mirror as claimed in claim 1, wherein each connecting sleeve and connecting element define an annular gap therebetween which is of a lesser width towards the mirror plate than towards the adjusting element, and an adhesive material filling said gap.

5. A mirror as claimed in claim 1, in which said mirror surface is formed on the front side of a metallic plate or foil which is formed from a monocrystal free of any grain boundaries.

6. A mirror as claimed in claim 1, wherein said mirror plate is a monocrystalline metal plate having said trunnions propagated rearwardly therefrom, and an alloy material being smelted under and into the trunnions.

7. A mirror as claimed in claim 1, wherein said mirror plate comprises a compound plate of fiber-reinforced structural material with a metallic foil fastened on the front surface thereof forming said mirror surface.

8. A mirror as claimed in claim 7, wherein said mirror surface is formed by a plurality of mutually separated individual foil segments, each said foil segment being associated with a rearwardly formed trunnion.

9. A mirror as claimed in claim 1, wherein the root area of the transition of said rear surface of the mirror plate to each trunnion is configured through its geometry and the orientation of reinforcing fibers in a compound plate structural material for compensating for the anisotropy of the mechanical properties of the mirror plate in and behind the mirror surface.

10. A mirror claimed in claim 1, wherein uncoupling barriers are formed on said rear surface of the mirror plate at the run of the mirror plate and between neighboring trunnions on the rear surface, said uncoupling barriers comprising material reinforcements and material weakenings.

11. A mirror as claimed in claim 1, wherein each adjusting element includes a modulation actuating element and a correcting adjusting element arranged in series therewith.

12. A mirror as claimed in claim 1, wherein each adjusting element includes an adjustment means in series therewith, each said adjustment means being supported in a spaced abutment, spaced from the rear surface of the mirror plate.

13. A mirror as claimed in claim 1, wherein the mirror includes a housing which encloses the space behind said rear surface of the mirror plate, said space being filled with an electrically-insulating liquid having a relatively high viscosity and good heat conducting capacity.

14. A mirror as claimed in claim 13, wherein gas cushions are arranged behind said rear surface of the mirror plate intermediate said adjusting elements.

* * * * *